United States Patent Office 3,504,026
Patented Mar. 31, 1970

3,504,026
BENZENESULFONYL-UREAS
Walter Aumuller, Kelkheim, Taunus, Helmut Weber and Rudi Weyer, Frankfurt am Main, Karl Muth, Kelkheim, Taunus, and Erich Fauland, Mannheim-Waldhof, Germany, assignors to Farbwerke Hoechst Aktiengesellschaft vormals Meister Lucius & Bruning, Frankfurt am Main, Germany, a corporation of Germany
No Drawing. Filed Sept. 7, 1966, Ser. No. 577,619
Claims priority, application Germany, Sept. 10, 1965, F 47,142
Int. Cl. C07c 127/16
U.S. Cl. 260—553            6 Claims

ABSTRACT OF THE DISCLOSURE

Nortricyclyl- and adamantyl-substituted acylamidobenzene sulfonyl ureas having hypoglycemic activity are disclosed.

---

The present invention relates to benzenesulfonyl-ureas corresponding to the formula

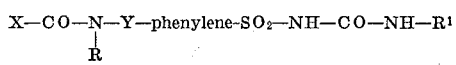

which as substance or in the form of their salts show hypoglycemic properties and are distinguished by a strong and long-lasting hypoglycemic action.

In the above-mentioned formula—

R represents a hydrogen atom or a lower alkyl or lower phenylalkyl radical,
R¹ represents nortricyclyl or admantyl,
X represents:

(a) a phenyl radical carrying in any desired positions the substituents Z and Z′ which may be identical or different, Z represents hydrogen, halogen, lower alkyl, alkenyl, alkoxy, alkenoxy, halogen-alkoxy, alkoxyalkoxy, phenalkoxy, phenylalkyl, cycloalkoxy, phenyl, phenoxy, lower acyl, benzoyl, trifluoromethyl, hydroxy, lower acyloxy, —CN, —NO₂,
Z′ represents hydrogen, halogen, lower alkyl, alkoxy, alkoxyalkoxy, halogen-alkoxy or acyloxy, hydroxy,
(b) a naphthyl radical which may be mono- or disubstituted by halogen, lower alkyl, lower alkoxy or hydroxy,
(c) a tetrahydronaphthyl radical or an indanyl radical,
(d) a thiophenyl radical which may be mono- or disubstituted by lower alkyl, phenylalkyl, alkoxy, alkoxyalkoxy, alkenoxy, phenylalkoxy or halogenalkoxy, aryl or halogen,
(e) a tetramethylene radical or a trimethylenethenyl radical,
Y represents a hydrocarbon chain with 1 to 4 carbon atoms.

In the above and the following definitions "lower alkyl" always stands for an alkyl group containing 1 to 4 carbon atoms in a straight or branched chain. "Lower acyl" stands for an acyl radical (organic acid radical) containing up to 4 carbon atoms, preferably a straight-chained or brainched alkanoyl radical of a corresponding length of chain.

According to the above-mentioned definitions R may represent, for instance, methyl, ethyl, propyl, butyl, benzyl, β-phenylethyl, compounds in which R represents hydrogen being preferred.

Ring systems representing the member X in the above-mentioned formula, are, for example, the following:

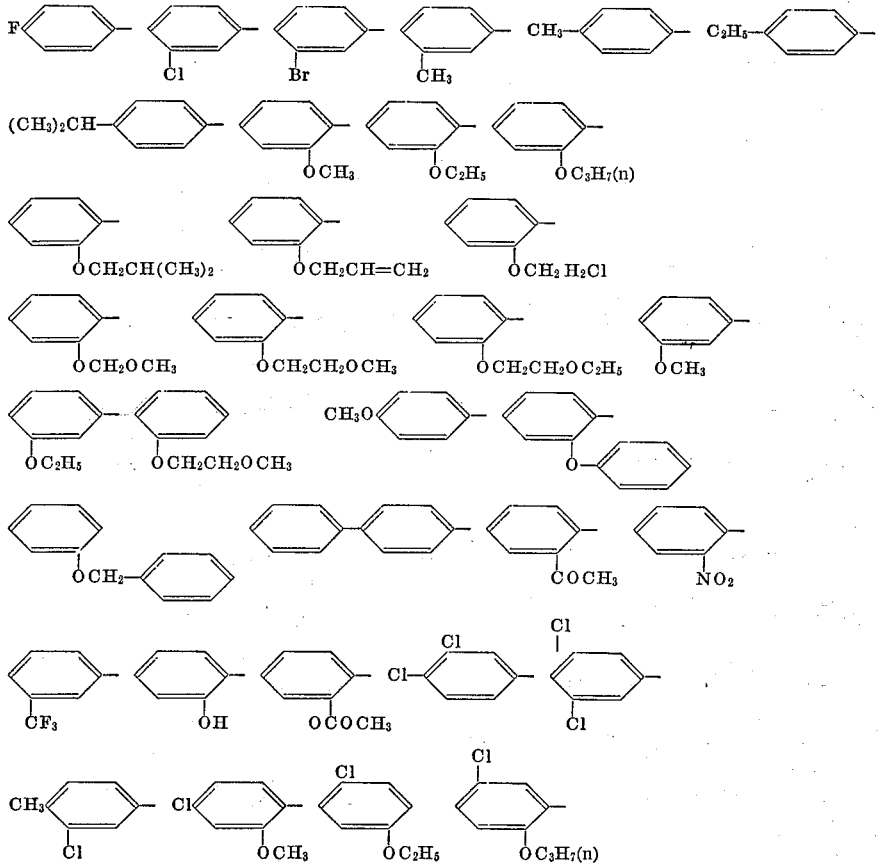

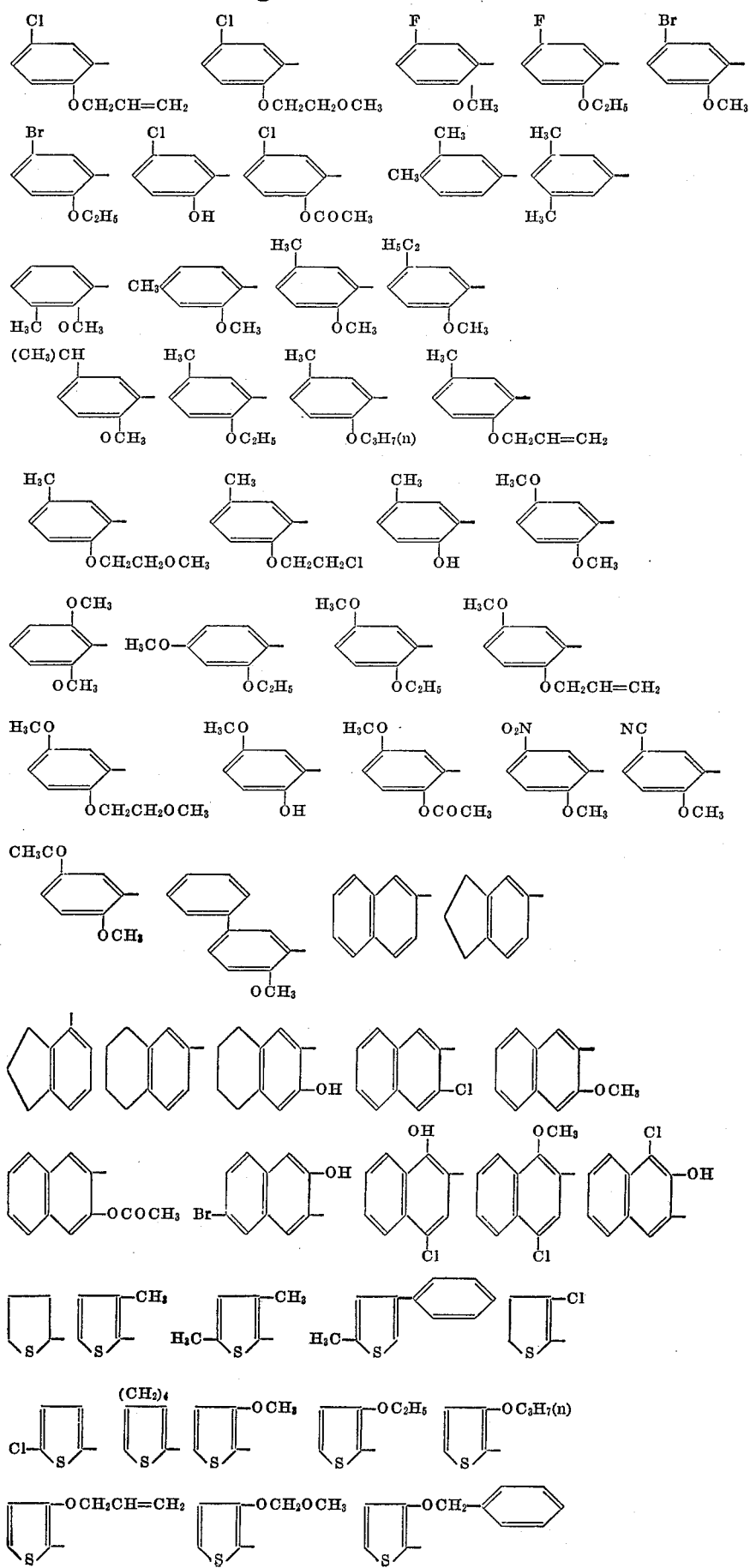

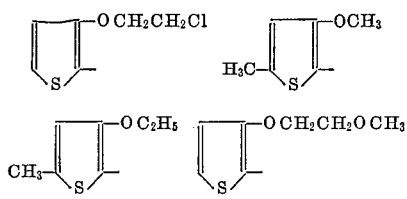

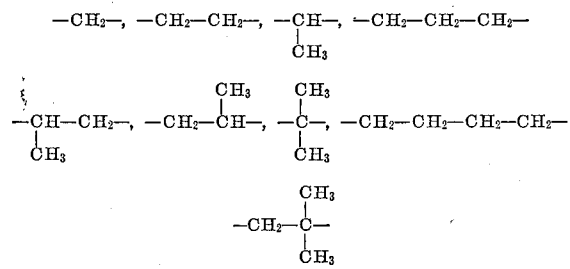

As examples for the bridge member Y there are mentioned:

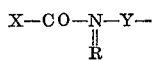

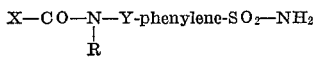

$$-CH_2-C(CH_3)_2-CH_3$$

The phenylene group mentioned in the formula by "phenylene" is preferably unsubstituted. It may, however, likewise be mono-or poylsubstituted by halogen, lower alkyl or lower alkoxy. It may carry the remaining parts of the molecule in ortho, meta- or para-positoin to each other, the para-position being preferred.

The present invention likewise relates to processes for the preparation of said benzenesulfonyl ureas wherein:

(a) Benzenesulfonyl - isocyanates, benzenesulfonyl-carbamic acid esters, benzenesulfonyl-thiocarbamic acid esters, benzenesulfonyl-carbamic acid halides or benzene-sulfonyl-ureas substituted by the group $$X-CO-N-Y-\underset{R}{|}$$

are reacted with $R^1$-substituted amines, or, if desired, the salts thereof.

(b) Benzenesulfonamides of the formula

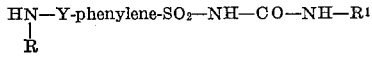

or their salts are reacted with $R^1$-substituted isocyanates, carbamic acid esters, thiocarbamic esters, carbamic acid halides or ureas.

(c) Correspondingly substituted benzenesulfonyl-isourea ethers, benzenesulfonyl-isothiourea ethers or benzene sulfonyl-parabanic acids are hydrolyzed.

(d) In correspondingly substituted benzenesulfonyl-thioureas the sulfur atom is exchanged for an oxygen atom.

(e) In benzenesulfonyl-ureas of the formula $$HN-Y\text{-phenylene-}SO_2-NH-CO-NH-R^1$$
$$\underset{R}{|}$$

the radical X—CO— is introduced by acylation, the reaction products being treated, if desired, with alkaline agents in order to cause salt formation.

According to the nature of the member X one or other of the methods mentioned above may, in the case of certain individual compounds coresponding to the general formula, be unsuitable, or, at least require measures for the protection of active groups. Such cases which do not occur very often can easily be recognized by the expert and there will be no difficulty in applying in these cases one of the other methods of synthesis described above.

Instead of the benzenesulfonyl-isocyanates there can likewise be used reaction products of benzenesulfonyl-isocyanates with acid amides such, for example, as caprolactam or butyrolactam, furthermore with weakly basic amines such, for example, as carbazoles.

The bove-mentioned benzenesulfonyl-carbamic acid esters or the benzenesulfonyl-thiocarbamic acid esters may contain in the alcohol component a low-molecular alkyl group or a phenyl group. The same applies to the $R^1$-substituted carbamic acid esters or the corresponding monothio-carbamic acid esters. The term low-molecular or lower alkyl group is used herein in all cases to mean an alkyl group containing not more than 4 carbon atoms. As carbamic acid halides there are suitable, above all, the chlorides.

The benzenesulfonyl-ureas used as starting substances for the process of the invention may be unsubstituted at the side of the urea molecule opposite to the sulfonyl group or may be mono- or di-substituted, preferably by lower alkyl groups or aryl groups. Instead of benzenesulfonyl-ureas substituted in the above-mentioned way there can likewise be used corresponding N-benzenesulfonyl-N'-acyl-ureas (acyl=lower aliphatic acyl such, for example, as acetyl, propionyl or butyryl, but likewise benzoyl) and also bis-(benzenesulfonyl)-ureas. It is, for instance, possible to treat such bis-(benzenesulfonyl)-ureas or N-benzene-sulfonyl-N'-acyl ureas with amines $R^1NH_2$ and to heat the salts so obtained to an elevated temperature, particularly to a temperature above 100° C.

Furthermore, it is possible to start from ureas of the formula $R^1-NH-CO-NH_2$ or acylated ureas of the formula $R^1-NH-CO-NH$-acyl, wherein acyl preferably represents a low-molecular aliphatic or aromatic acid radical or the nitro group, or from phenyl-ureas of the formula $R^1-NH-CO-NH-C_6H_5$ or from diphenyl-ureas of the formula $R^1-NH-CO-N(C_6H_5)_2$. The phenyl groups can be substituted or linked to each other directly or likewise by means of a bridge member such as $-CH_2-$, $-NH-$, $-O-$ or $-S-$. It is likewise possible to start from N,N'-di-substituted ureas of the formula $R^1-NH-CO-NH-R^1$ and to react them with correspondingly substituted benzene-sulfonamides.

The sulfur atom in correspondingly substituted benzene-sulfonyl-thio-ureas can be replaced by an oxygen atom, for instance, with the aid of oxides or salts of heavy metals or likewise by treatment with oxidizing agents such, for example, as hydrogen peroxide, sodium peroxide or nitrous acid. Benzene-sulfonyl-isothio-urea ethers can likewise be desulfurized in this way.

Thioureas may likewise be desulfurized by treating them with phosgene or phosphorus pentachloride. Chloroformic acid amidines or chloroformic acid carbodiimides obtained as intermediate products can be converted into the benzenesulfonyl-ureas by suitable processes such, for instance, as saponification or addition of water.

Generally, the methods of carrying out the aforesaid processes may vary within wide limits as regards the reaction conditions, and they may be adapted to each individual case. The reactions may be carried out, for example, by using solvents, at room temperature or at an elevated temperature.

The blood sugar lowering action of the benzenesulfonyl-urea derivatives described above can be ascertained, for example, in rabbits by administering to the animal the products of the invention in the form of the sodium salt and in a dose of 10 milligrams/kilogram of body weight and by determining the blood sugar value according to the known method of Hagedorn-Jensen or by means of an auto-analyser over a prolonged period.

It has been found, for example, that a dose of 10 mg./kg. of N-[4-(β-benzamido-ethyl)-benzenesulfonyl] N'-nortricyclyl-urea or of N-[4-(β-4-chloro-benzamido-ethyl)-benzenesulfonyl]-N'-nortricyclyl-urea or of N-[4-(β - 3 - chlorobenzamido-ethyl)-benzenesulfonyl]-N'-nor-tricyclyl-urea, administered in the form of the sodium salts causes a lowering of the blood sugar level of 30% or 54% or 43% respectively after a period of 3 hours and that they are superior to the known hypoglycemically active compounds, for instance, N-[4-methyl-benzenesulfonyl]-N'-butyl-urea which in a dosage inferior to 25 mg./ kg. no more lowers the blood sugar level in rabbits. As regards the toxicity of the compounds, the values are within the same range as those of benzenesulfonyl-ureas, for instance N-[4 - methyl-benzenesulfonyl]-N'-n-butyl-urea and N-[4-methyl-benzenesulfonyl]-N'-cyclohexyl-urea the $LD_{50}$ of which amounts to 2.5 or 4.8 grams/kg. respectively, with oral application.

The hypoglycemic effect of two further compounds belonging to the object of the invention is shown by the following table.

| Compound | Dose, mg./kg. | Lowering of blood sugar level in rabbits after (hours)— | | | | | |
|---|---|---|---|---|---|---|---|
| | | 1 | 3 | 6 | 24 | 48 | 72 |
| I | 10 | 36 | 48 | 42 | 36 | 18 | 0 |
| II | 10 | 33 | 31 | 29 | 25 | 19 | 0 |
| | 1 | 33 | 32 | 37 | 25 | 0 | |

I—N-[4-(β-2-methoxy-benzamidoethyl)-benzenesulfonyl]-N'-nortricyclyl-urea.
II—N-[4-(β-2-methoxy-5-chloro-benzamidoethyl)-benzenesulfonyl]-N'-nortricyclyl-urea.

The lower limit for the dose still causing a lowering of the blood sugar level in rabbits which could be ascertained amounts for compound I to 0.2 mg./kg. and for compound II to 0.1 mg./kg.

In order to eliminate the influence of adsorption processes or of other side reactions in the gastro-intestinal tract, the compounds of the adamantane series were administered intravenously in the form of the potassium salts. The known N-sulfanilyl-N'-n-butyl-urea (BZ 55) known as commercial product was examined under the same conditions.

For the N-[4 - (β-benzamido-ethyl)-benzenesulfonyl] N'-(1-adamantyl)-urea a relative BZ 55-effect of 200 and for N-[4 - (β-o-methoxy-benzamido-ethyl)-benzenesulfonyl]-N'-(1-adamantyl)-urea a relative BZ 55-effect of 400–800 was found.

As "Relative BZ 55-effect" there is to be understood the hypoglycemic action of a substance referred to N-sulfanilyl-N'-n-butyl-urea (BZ 55), as unit being considered the still occurring lowering of the blood sugar level after intraveneous injection of 200 milligrams of N-sulfanilyl-N'-n-butyl-urea per kilogram of body weight.

It results therefrom that the products of the invention show a very strong hypoglycemic action accompanied by a good tolerability.

The compounds of the present invention are preferably used for the production of orally administerable preparations showing hypoglycemic action in the treatment of diabetes mellitus; they can be used as such or in the form of their salts or in the presence of substances causing salt formation. For the salt formation there may be used for example: alkaline agents such, for example, as alkali metal hydroxides, alkaline earth metal hydroxides, alkali metal carbonates or alkaline earth metal carbonates, alkali metal bicarbonates or alkaline earth metal bicarbonates.

The pharmaceutical preparations are preferably made up in the form of tablets containing in addition to the products of the present invention the usual adjuvants and carrier substances such, for example, as talc, starch, lactose, tragacanth or magnesium stearate.

A preparation containing one of the benzenesulfonyl-ureas of the present invention as active substance, for example, a tablet or a powder, with or without the aforesaid additives is preferably formed into a suitable dosage unit form. The dose chosen should take into consideration the activity of the benzenesulfonyl-urea used and the desired effect. Advantageously the dosage per unit amounts to about 0.5 to 100 milligrams, preferably 2 to 10 milligrams, but considerably higher or lower dosage units can also be used, which, if desired, are divided or multiplied prior to administration.

The following examples serve to illustrate the invention but they are not intended to limit it thereto.

EXAMPLE 1

N-[4-(β-benzamido-ethyl)benzenesulfonyl]-N'-nortricyclyl-urea 18.1 grams of N-[4-(β-benzamido-ethyl)-benzenesulfonyl]-methyl-urethane are dissolved in 500 milliliters of dioxane. 6 grams of nortricyclyl-amine are added and the whole is heated to boiling for 1 hour under reflux. After concentration under reduced pressure, the residue obtained is taken up in ammonia of about 1% strength. The mixture is filtered and the filtrate is acidified by means of dilute hydrochloric acid. The crystalline precipitate of N - [4-(β-benzamido-ethyl)-benzenesulfonyl] N'-nortricyclyl-urea obtained is filtered off with suction, dried and recrystallized from methanol. (Melting point 195–197° C.)

In an analogous manner there is obtained from
N-[4-(β-3-chlorbenzamido-ethyl)-benzenesulfonyl]-
  methyl-urethane and nortricyclyl-amine
N-[4-(β-3-chlorbenzamido-ethyl)-benzenesulfonyl]-
  N'-nortricyclyl-urea of a melting point of 195–197° C.
  (from methanol); from
N-[4-(β-4-chlorbenzamido-ethyl)-benzenesulfonyl]-
  methyl-urethane
N-[4-(β-4-chlorobenzamido-ethyl)-benzenesulfonyl]-
  N'-norticyclyl-urea of a melting point of 197–199° C.
  from methanol; from
N-[4-(β-2-methoxy-benzamido-ethyl)-benzenesulfonyl]-
  methyl-urethane:
N-[4-(β-2-methoxy-benzamido-ethyl)-benzenesulfonyl]-
  N'-nortricyclyl-urea of a melting point of 185–187° C.
  (from ethanol); from
N-[4-(β-2-methoxy-5-chloro-benzamido-ethyl)-benzene-
  sulfonyl]-methyl-urethane:
N-[4-(β-2-methoxy-5-chloro-benzamido-ethyl)-benzene-
  sulfonyl]-N'-nortricyclyl-urea of a melting point of
  177–179° C.; from
N-[4-(β-benzamido-propyl)-benzenesulfonyl]-ethyl-
  urethane:
N-[4-(β-benzamido-propyl)-benzenesulfonyl]-N'-
  nortricyclyl-urea of a melting point of 197° C. (from
  a mixture of ethanol and water); from
N-[4-(β-tetrahydronaphthalene-(2)-amido-ethyl)-
  benzenesulfonyl]-ethyl-urethane:
N-[4-(β-tetrahydronaphthalene-(2)-amido-ethyl)-
  benzenesulfonyl]-N'-nortricyclyl-urea (melting point
  174° C., from ethanol and water).

EXAMPLE 2

N-[4-benzamidomethyl-benzenesulfonyl]-N'-(nortricyclyl)-urea 3.5 grams of 4-(benzamidomethyl)-benzenesulfonyl-urethane are heated with 1.1 gram of nortricyclyl-amine for 1 hour to 130° C. in the oil bath. With evolution of methanol a clear melt is formed. It is allowed to cool, the reaction product is treated with ammonia of 1% strength, filtered and acidified by means of dilute hydrochloric acid. The N-[4-benzamidomethyl-benzene-sulfonyl]-N'-(nortricyclyl)-urea is recrystallized from a mixture of water and ethanol and melts at 187–189° C.

EXAMPLE 3

N-[4-(β-benzamidoethyl)-benzenesulfonyl]-N'-(nortricyclyl)-urea 15.2 grams of 4-(β-benzamidoethyl)-benzenesulfonamide are dissolved in 100 milliliters of acetone and 25 milliliters of 2 N-sodium hydroxide solution. With stirring and cooling 8.5 grams of nortricyclyl-isocyanate are dropwise added and the solution is stirred for 2 hours at room temperature. The acetone is removed by distillation under reduced pressure, the residue is treated with ammonia of 1% strength, the solution is filtered and acidified. The N-[4-(benzamidoethyl)-benzenesulfonyl]-N'-(nortricyclyl)-urea obtained melts at 195–197° C. after having been recrystallized from methanol. In an analogous manner there are obtained from the corresponding sulfonamides:

N-[4-(β-<3-fluorobenzamido>-ethyl)-benzenesulfonyl]-N'-(nortricyclyl)-urea of a melting point of 202–203° (from methanol), N-[4-(β-<3-trifluoromethyl-benzamido>-ethyl)-benzenesulfonyl]-N'-(nortricyclyl)-urea of a melting point of 194–196° (from methanol) and N-[4-(β-<3-methoxythiophene-2-carbonamido>-ethyl)-benzenesulfonyl]-N'-(nortricyclyl)-urea of a melting point of 196–197° C. (from a mixture of methanol and dimethyl-formamide)

EXAMPLE 4

N-[4-(β-benzamidoethyl)-benzenesulfonyl]-N'-(nortricyclyl)-urea 8.65 grams of N-[4-(β-benzamidoethyl)-benzenesulfonyl]-urea (melting point 220–222° C.) are heated to boiling in a mixture of 300 milliliters of toluene and 30 milliliters of monomethylglycol with 1.65 grams of glacial acetic acid and 3.1 grams of nortricyclylamine for 5 hours at the reflux cooler. The mixture is concentrated under reduced pressure and the residue is triturated with alcohol. The reaction product is filtered off with suction and reprecipitated from ammonia of 1% strength. After recrystallization from methanol the N-[4-(β-benzamidoethyl)-benzenesulfonyl]-N'-(nortricyclyl)-urea melts at 195–197° C.

EXAMPLE 5

N-[4-(β-benzamidoethyl)-benzenesulfonyl]-N'-(nortricyclyl)-urea 23.6 grams of 4-(β-benzamidoethyl)-benzenesulfonamide-sodium are heated in 200 milliliters of dimethyl-formamide with 13 grams of nortricyclyl-carbamic acid ethyl-ester for 4 hours to 140° C. The solution is then concentrated, the residue is treated with water and hydrochloric acid, the reaction product is filtered off with suction and recrystallized fom methanol. The N-[4-(β-benzamidoethyl) - benzenesulfonyl] - N' - (nortricyclyl) urea melts at 195–197° C.

EXAMPLE 6

N-[4-(β-benzamidoethyl)-benzenesulfonyl]-N'-(1-adamantyl)-urea 9.7 grams of 4-(β-benzamidoethyl)-benzenesulfonyl-methyl-urethane are slowly heated for 3 hours to 120° C. in 50 cc. of absolute toluene with 4 grams of amino adamantane, the forming alcohol being simultaneously distilled off. After cooling, the N-[4-β-benzamidoethyl)-benzenesulfonyl]-N'-(1-adamantyl)-urea crystallizes out, it is filtered off with suction and washed with ether. For purification, the substance is taken up in sodium carbonate solution, treated with animal charcoal and, after filtration, reprecipitated with hydrochloric acid; melting point 244° C. In an analogous manner there is obtained from 4 - (β-o-methoxy - benzamidoethyl) - benzenesulfonyl-methyl-urethane (melting point 168° C.):

N-[4-(β-o-methoxy-benzamidoethyl)-benzenesulfonyl] N'-(1-adamantyl)-urea of a melting point of 144° C. (purified by means of the ammonium salt); from 4-(β-m-toluylamidoethyl)-benzenesulfonyl - methyl - urethane (melting point 188–191° C.):
N-[4-(β-m-toluylamidoethyl)-benzenesulfonyl] - N' - (1-adamantyl)-urea of a melting point of 185–187° C. (purified by means of the sodium salt).

EXAMPLE 7

N-[4-(β-benzamido-ethyl)-benzenesulfonyl]-N'-nortricyclyl-urea (a) N - [4 - (β-benzamido-ethyl) - benzenesulfonyl]-imino-dithio-carbonic acid potassium.—152 grams of 4-(β-benzamido-ethyl)-benzenesulfonamide are dissolved in 700 milliliters of dimethylformamide. 56 grams of KOH dissolved in 200 milliliters of water are added and the mixture is stirred for some minutes. With further stirring 38 grams of carbon disulfide are dropwise added. After stirring for 2 hours and 30 minutes at room temperature a small amount of undissolved matter is filtered with suction from the reaction mixture and about 4 liters of ethanol are added to the filtrate. A light-yellow crystallisate of N - [4 - (β-benzamido-ethyl)-benzenesulfonyl]-imino-dithiocarbonic acid potassium is obtained which is filtered off with suction, washed with ethanol and dried. The substance is soluble in water.

(b) N-[4-(β-benzamido - ethyl)-benzenesulfonyl]-N'-nortricyclyl-isourea-methyl ether.—20.8 grams of the potassium salt obtained according to Example 7(a) are dissolved in 300 milliliters of methanol. 5.5 grams of nortricyclyamine are added and the solution is heated with stirring to about 65° C. After addition of 21.6 grams of mercury oxide stirring is continued for 4 hours and 30 minutes at the boiling temperature of the methanol. (Reflux.) The HgS formed is filtered off with suction and concentrated. As residue there remains behind a viscous resin of crude N - [4 - (β-benzamido-ethyl)-benzenesulfonyl]-N'-nortricyclyl-isourea-methyl ether.

(c) N-[4-(β - benzamido-ethyl) - benzenesulfonyl]-N'-nortricyclyl-urea.—A sample of the isourea ether obtained according to 7(b) is dissolved in dimethyl-formamide. After addition of 2 N-sodium hydroxide solution in excess, the solution is heated with stirring for 2 hours to about 90° C. It is diluted with water and acidified. The precipitate of N-[4-(β-benzamidoethyl)-benzenesulfonyl]-N'-nortricyclyl-urea obtained, after recrystallization from methanol, melts at 195–197° C.

We claim:
1. Benzenesulfonyl-urea corresponding to the general

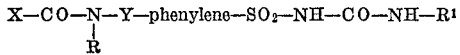

wherein:

R is hydrogen, lower alkyl or phenyl-lower alkyl,
R¹ is nortricyclyl,
X is—
  (a) unsubstituted phenyl, phenyl mono-substituted by halogen, lower alkyl, lower alkenyl, lower alkoxy, lower alkenoxy, halogen-lower alkoxy, lower alkoxy-lower alkoxy, phenyl-lower alkoxy, phenyl-lower alkyl, phenyl, phenoxy, lower carboxylic acyl, benzoyl, trifluoromethyl, hydroxy, lower carboxylic acyloxy, —CN, —NO₂, or phenyl additionally substituted by halogen, lower alkyl, lower alkoxy, lower alkoxy-lower alkoxy, halogen-lower alkoxy, carboxylic acyloxy, or hydroxy,
  (b) unsubstituted naphthyl radical or naphthyl mono- or disubstituted by halogen, lower alkyl, lower alkoxy, hydroxy or acetyloxy,
  (c) tetrahydronaphthyl or indanyl,
  (d) unsubstituted thiophenyl or thiophenyl mono- or disubstituted by lower alkyl, phenyl-lower alkyl, lower alkoxy, lower alkoxy-lower alkoxy, lower alkenoxy, phenyl-lower alkoxy or halogen-lower alkoxy, phenyl or halogen,
  (e) tetramethylene- or trimethylene-thenyl radical,
Y is a saturated hydro-carbon bridge of 1 to 4 carbon atoms or a physiologically tolerable salt thereof.
2. A compound as defined in claim 1 wherein the phenylene is substituted in para-position.

3. N - [4 - (β-benzamidoethyl) - benzenesulfonyl]-N'-nortricyclyl-urea.

4. N - [4 - (β-3-chlorobenzamido-ethyl) - benzenesulfonyl]-N'-nortricyclyl-urea.

5. N - [4 - (β-2-methoxy-benzamidoethyl)-benzensulfonyl]-N'-nortricyclyl-urea.

6. N - [4 - (β-2-methoxy-5-chloro - benzamidoethyl)-benzenesulfonyl]-N'-nortricyclyl-urea.

References Cited

UNITED STATES PATENTS 3,426,067　2/1969　Weber et al. _____ 260—553
3,096,372　7/1963　Gerzon _____ 260—553

FOREIGN PATENTS 43,16M　　8/1966　France.
1,440,351　4/1966　France.

OTHER REFERENCES

German printed application (Auslegeschrift) No. 1,185,180, published Jan. 14, 1965.

JOHN D. RANDOLPH, Primary Examiner

U.S. Cl. X.R.

260—465, 332.5, 332.3, 545, 470, 564, 552, 309.5, 566, 513.5; 424—275, 321